United States Patent [19]
Gaehwiler

[11] Patent Number: 5,375,621
[45] Date of Patent: Dec. 27, 1994

[54] CHECK VALVES

[75] Inventor: Heinz U. Gaehwiler, Wulftieni, Germany

[73] Assignee: EMS-Inventa AG, Switzerland

[21] Appl. No.: 185,458

[22] Filed: Jan. 21, 1994

Related U.S. Application Data

[63] Continuation of Ser. No. 29,013, Mar. 10, 1993, abandoned.

[30] Foreign Application Priority Data

Mar. 11, 1992 [CH] Switzerland .................. 000792/92-3

[51] Int. Cl.$^5$ .............................................. F16K 15/06
[52] U.S. Cl. ........................ 137/220; 137/528; 137/533.27; 251/368
[58] Field of Search ................ 137/220, 528, 533.27; 251/368

[56] References Cited

U.S. PATENT DOCUMENTS

| | | | |
|---|---|---|---|
| 1,710,214 | 4/1929 | Hassold | 137/220 X |
| 1,795,749 | 3/1931 | Winters | 137/533.27 |
| 4,172,465 | 10/1979 | Dashner | 137/533.27 |
| 4,556,084 | 12/1985 | Frawley | 137/533.27 |
| 5,080,122 | 1/1992 | Neuzeret | 137/220 X |

Primary Examiner—Robert G. Nilson
Attorney, Agent, or Firm—Bierman and Muserlian

[57] ABSTRACT

A diaphragm- and spring-less check valve for gaseous media comprising an inlet housing (41) having a sealing edge (51), an outlet housing (11) and a closure body (30) disposed in between the housings, which is guided so as to be axially (14) movable and capable of being impressed bilaterally in any desired position and/or state of the valve, wherein the closure body (30) is moveable exclusively on the basis of a differential pressure between inlet (41) and outlet housing (11) in the blocking position against the sealing edge (51) and in the through-put position the sealing edge (51).

26 Claims, 6 Drawing Sheets

CHECK VALVES

This is a continuation of Ser. No. 029,013 filed Mar. 10, 1993, now abandoned.

Valves of this type are used for example in servo aggregates for brake power assistance in motor vehicles and are installed there for example between a vacuum pipe and the servo aggregate. They have the task of opening the connection between vacuum pipe and vacuum tank as soon as the pressure in the vacuum tank is higher that in the vacuum pipe. On the other hand, the valve is to close tightly when the pressure in the vacuum pipe is higher than that in the vacuum tank. Since modern motor vehicles have a pronounced braking power support through the stated servo aggregate, its reliable functioning is highly important even if the brakes do not fail completely when the support fails. In the motor vehicle, a check valve is either switched in the connection line from the vacuum pipe to the vacuum tank or directly added to the tank.

The reliable function must be ensured especially under unfavorable conditions such as can occur in the motor vehicle. For example, in the case if motor fuel present in the vacuum system collects in the valve, it can lead to a swelling of the closure element. It is likewise important that the valve in any conceivable state and/or position of the part generating the blocking effect always blocks and/or opens smoothly, that it has, even under only slight pressure differences a good blocking effect and that no unintentional reduction of the vacuum in the servo tank can occur.

The known valves have as a rule structural parts which support or enhance the motion of The structural part generating the blocking effect. Most frequently, these structural parts are springs or similarly acting elements. It is also known to deform the part generating the blocking effect of the valves on the basis of constructional implementations of the inner housing of the valves to enhance the return motion in the blocking position. Additionally, or also alternatively, in the known valves, rubber parts are frequently provided which generate the sealing effect in the blocking position. Other valves are provided with diaphragm parts which generate the opening or blocking of the valve.

A common disadvantage of the known valves resides in the relatively large number of the structural parts used, whose particular operatability it required to ensure the effect of the valve. But the greater the number of discrete structural parts of a valve is, the greater is the danger of failure of the structural elements. Furthermore, the known valves, due to the different structural elements, have a variety of materials which also is disadvantageous. Particular materials, for example, rubbery parts, can be negatively influenced in terms of operatability by the medium flowing through the valve, at least with respect to their operating life. Furthermore, with the known valves, problems occur in view of recyclability and specifically due to the different materials of the discrete structural elements.

OBJECTS OF THE INVENTION

It is an object of the invention to provide a check valve which is simple to manufacture and is reliable in its functions.

It is another object of the invention to provide a check valve which will function even if fuel or other corrosive liquids collect in the region of the valve.

These and other objects and advantages of the invention will become obvious from the following detailed description.

THE INVENTION

The novel check valve of the invention is a diaphragm- and spring-less check valve for gaseous media comprising an inlet housing (41) having a sealing edge (51), an outlet housing (11) and a closure body (30) disposed in between the housings, which is guided so as to be axially (14) movable and capable of being impressed bilaterally in any desired position and/or state of the valve, wherein the closure body (30) is moveable exclusively on the basis of a differential pressure between inlet (41) and outlet housing (11) in the blocking position against the sealing edge (51) and in the through-put position away from the sealing edge (51). The check valve of the invention is simple to manufacture and has a reliable functioning.

It is the task of the present invention to provide a check valve whose manufacture is favorable and whose reliability of function is always ensured in every state of the valve and/or position of the structural element generating the blocking effect, particularly in the case in which fuel or the like collects in the region of the check valve.

A fundamental advantage of the check valve resides in that no diaphragm or springs are required for its operation and it is not necessary to use rubber parts to achieve the targeted blocking effect. Also the structural element effecting the blocking effect, namely the closure body, is free of any external and internal forces, i.e. no structural elements or constructional implementation are required to move the closure body in the interior of the valve, be it into the opening position or into the blocking position or into an intermediate position. Forces acting externally on the closure body can be present, for example in the form of a spring, which in the case of the check valve is precisely not required. Forces in the interior of the closure body which support its change of position or even bring it about, can be for example a deformation of the closure body per se, which, for example, is forced in an open position of the valve onto the closure body to support subsequently the blocking position of the closure body or even bring it about. This can be particularly a deformation energy generated in the closure body which also, within the scope of the check valve, can be entirely dispensed with. Effect of an external force in this connection is understood also to include gravity per se which in the case of some valves is required to be able to achieve one or the other position of the closure body at all.

In summary, the particular feature characterizing the check valves of the invention is making force-less the closure body and specifically in any position of the closure body and any state of the valve. It is understood that through such an implementation of a check valve, the number of structural elements of the valve can be reduced to the absolutely minimally possible number. Also, the reliability of function of the check valve is always ensured, for example also in the event of the rollover of a motor vehicle, in which a check valve installed in the motor vehicle could assume any conceivable position. The motion of the closure body in the check valve is caused solely by the pressure differences obtaining on the one or the other side of the closure body and the flow brought about thereby.

The pressure differences effect a motion of the closure body in any position conceivable for the closure body and specifically without therein further external forces acting upon the closure body being required or inner forces present or development in the closure body itself. It will be explained below that the construction of the check valve makes possible inter alia to produce all structural elements of the check valve of the same or similar material to achieve the unrestricted recyclability of the valve.

In the check valve of the invention, it is of advantage that the closure body in the check valve is supported so as to be axially movable whereby the closure element for blocking the check valve does not need to be deformed itself as is the case for example when using diaphragms. The check valve is preferably circular in cross section so that the sealing edge results as an annular stop face or stop ring on which the closure body can rest sealingly due to its movable support. A further advantage of the check valve resides in that this inter alia does not have any elements made of rubber or similar materials. The new fuels are increasingly alloyed with very aggressive MTBE, a methyltertiarybutylether, evening out the combustion, which attacks particularly rubber and consequently contributes to an accelerated aging of check valves which use diaphragms made of rubber. In the check valve, the new fuels cannot cause any damages.

The closure body can advantageously be disposed on the outlet housing or on the inlet housing of the check valve. In both cases, the movability of the closure element is ensured wherein its motion is caused by different pressure conditions in the outlet housing, on the one hand, and in the inlet housing, on the other hand.

For a useful arrangement of the closure body on the outlet housing or on the inlet housing, a projecting pin can be provided preferably disposed in the longitudinal axis of the housings. The pin represents the position securement of the closure element perpendicularly to the longitudinal axis of the housing and consequently permits the intended motion of the closure body in the direction of the longitudinal axis of the housing for opening or for blocking the check valve.

The closure body is preferably made in funnel-form wherein the funnel-form portion closes the check valve by resting on the sealing edge and the tube-form funnel end is made so as to be closed. During motion of the closure body in the check valve duct to the corresponding pressure conditions, the funnel-form portion can be moved toward the sealing edge to close the check valve or it can be moved away from the sealing edge to open the check valve. The tube-form funnel end is made so as to be closed to ensure the intended sealing when the closure body is resting on the sealing edge. It is advisable to make the housings as well as the closure body symmetrical with respect to the longitudinal axis of the housings so that the tube-form position is disposed in the center of the funnel-form body.

The funnel-form of the closure body has moreover the advantage that it has a resistance depending on the direction of flow so that the reliable function, that is the motion of the closure element in the direction of the longitudinal axis of the housings, is supported. The funnel-form portion has the additional advantage that, in contrast to flat diaphragms, a potential swelling leads only to a change of the angle of the funnel but not to a warping in the plane of the sealing line, that is the line on which the funnel-form portion rests on the sealing edge. A possible change of the funnel angle can for example be compensated through sufficient play between the rest of the funnel-form portion and the closure body wherein, in contrast, warping in the plane of the sealing line could lead to leaking in the blocking direction. Through construction of the closure body, which as a rule has only a small diameter, a better centering can be created than is possible in the case of closure bodies supported on the outer periphery.

The tube-form funnel end is advantageously disposed on the pin. The tube-form funnel end can in simple manner be pushed onto the pin wherein the length of the tube-form end and that of the pin are matched so that the closure body can move into the desired position without being restrained. The inner diameter of the tube-form funnel end corresponds essentially to the outer diameter of the free pin so that the intended motion of the closure body is not hindered in any way. Should liquids, for example fuel, reach the interior check valve and should the closure body swell, a special advantage of the inventive configuration becomes apparent. The widening of the inner diameter of the tube-form funnel end caused by a possible swelling does not hinder the closure valve body in its movement. It is understood that the diameter of the free pin cannot become enlarged through a possible swelling more than the widening of the inner diameter of the tube-form funnel end caused by a potential swelling, which can be ensured in a simple manner through appropriate material selection and/or dimensioning. In particular, the diameter fluctuations caused by a potential swelling cannot lead to leakage along the free pin serving as guidance.

The region next to the sealing edge is usefully realized as a guide device which serves for a deflection of a medium flowing into the inlet housing whereby the motion of the closure body in the blocking direction can be supported. The check valve would also close reliably without this additional implementation in the region of the sealing edge since the closure body, due to the pressure differences and its movable disposition, would be moved into the closing position and, additionally, the funnel-form portion is inclined against the direction of flow upon the entrance of the medium into the inlet housing. However, it can be desirable to support the motion of the closure body in the blocking direction, which can be achieved through the use of the guide device in the region of the sealing edge.

This region is constructed so that a deflection of the medium about the outer edge of the closure body in terms of fluid mechanics results whereby the flow resistance in the through flow direction, i.e. in the direction of the outlet housing is smaller than in the blocking direction, i.e. in the direction of the inlet housing. Similar to the stator of a gas turbine, a deflection of the medium is effected independently of the flow direction. If the medium flows in the blocking direction, a deflection in the opposite direction takes place so that a pressure increase or the development of a pressure difference in this region results.

For this purpose, the free end region of the funnel-form portion of the closure body projects preferably into this region to allow the pressure difference, generated by the guide device, to act in an advantageous manner upon the closure body which moves it supportingly toward the sealing edge to block the check valve. Through the generated pressure differential, a pressure develops on the inner side of the funnel when the medium flows through in the blocking direction which moves the closure body supportingly in the blocking direction. If, on the other hand, the flow proceeds in the direction of through-put, the flow resistance should in the most favorable case not be influenced minimally, i.e. be increased.

A useful construction of the region next to the sealing edge as a guide device can take place through a chamber next to the sealing edge which deflects by approximately 180° the medium flowing in this region in the direction of the inlet housing, before it can flow past the sealing edge into the interior of the inlet housing. The deflection of the medium generates the desired pressure rise or the desired pressure difference. The chamber is preferably disposed between the sealing edge and the outer closure of the inlet housing and, in the case of an inlet housing circular in cross section, as a circular depression or bead. The open region of the chamber of the depression is therein directed toward the outlet housing and consequently toward the medium entering the blocking direction. If the flow of the medium takes place in the through-put direction, the medium in this chamber is only made to rotate, whereby an air roller is generated which rotates in the direction of flow and which barely increases the flow resistance.

It is advantageous to construct the chamber so that medium flowing in the direction of the outlet housing can flow largely unhindered from the outlet housing. This can be achieved, for example when the sealing edge itself forms a portion of the chamber, and, viewed in the direction of the outlet housing, projects beyond the chamber bottom so that the medium exiting from the inlet housing cannot be caught in the chamber and increasing in this way the flow resistance.

The sealing edge is preferably made as an annular resting edge for the funnel-form portion whereby it forms a ring seat for the funnel-form portion as soon as the closure body is in the blocking position. The annular resting edge is preferably in a line-form resting contact between funnel-form portion and the sealing edge results.

Preferably, the outer diameter of the free margin of the funnel-form portion is greater than the diameter of the sealing edge in the form an annular resting edge. To achieve a sealing effect at all, the diameter of the free margin of the funnel-form portion must correspond at least to that of the annular resting edge. If the diameter is greater, however, it can, as already stated, project into the chamber disposed next to the sealing edge, which is of advantage for utilizing the effect of the chamber. Nevertheless, the diameter of the free margin of the funnel-form portion can obviously not correspond to the inner diameter of the inlet housing or the outlet housing since otherwise a throughflow of the check valve in the one or the other direction would no longer be possible.

To achieve a securement of the position of the closure body in the opening or blocking position in the direction of the longitudinal axis of the housings, devices are advantageously disposed on the outlet housing as well as on the inlet housing for the resting contact of the funnel-form portion. The devices preferably are webs extending radially from the center of the housings at a distance from one another. By using webs for the resting contact of the closure body or its funnel-form portion, it is nevertheless ensured in both throughflow directions that a sufficiently large cross section remains free for the passage of the medium in both directions of throughflow. Preferably, the free edges of the webs serving as resting edges and facing the funnel-form portion are made to be inclined toward the longitudinal axis of the housings wherein the slope of the free edges corresponds essentially to that of the funnel-form portion. The resting edges of the webs of the outlet housing and of the inlet housing are consequently inclined in each instance toward the outlet housing so that their slope corresponds to that of the funnel-form portion and a favorable resting contact between the closure body and the webs results which does not deform the closure body. Obviously, assurance must be given with respect to the inlet housing that through the resting contact of the funnel-form portion, the sealing contact of its webs on the sealing edge is not hindered.

A further important advantage of the check valve resides in its complete returnability since its structural elements can be made of one and the same type of material, preferably through the exclusive use of polymers for the structural elements of the check valve. Since for the lines between, for example, the vacuum pipe and the underpressure braking power assist, increasingly thermoplastic polymers are used, the line can be guided back together with the check valve if the structural elements of the check valve are made of the same polymer family. In the case of conventional pipes and conventional check valves, this is not possible since a separation can only take place with considerable expenditure and a disassembly of the valves to remove rubber elements or metal springs is completely uneconomical. Through the structure of the check valve, it becomes superfluous in a particularly advantageous manner to use a spring and/or diaphragm material with elastic reset capability, which previously was required for the function of a large portion of the know check valves.

The polymer material of all parts of the check valve is advantageously the same thermoplastic polymer family, which favorably influences the returnability as well as being of advantage for the production. Thermoplastic polymers are only truly elastic in a small range of deformation, which is sufficient for the check valve. This can be accepted since it is sufficient if the closure body only compensates the unevennesses of the ring or sealing seat which, as a rule, are slight and consequently compensates the region of the sealing edge. The same polymers can be used for the feed line and the check valve which additionally enhances the return or the recyclability.

Preferably the inlet housing, the outlet housing as well as the closure body can be made at least partially of a rigid polymer wherein it is wherein advisable to make the sealing edge which must seal by resting contact of the closure body, of an elastic polymer whereby, dimensional fluctuations through swelling can be suppressed. However, it is also possible that only one peripheral ring portion of the closure body be made of an elastic polymer and the remaining elements of the closure element as well as of the remaining structural elements of the check valve are made of a rigid polymer.

In the special embodiment in which the closure body is made of a rigid polymer and the sealing edge made of an elastic polymer material, an elastic lip can be applied on the free end of the sealing edge for example through compound injection molding. Since a closure body made of a rigid polymer material is insensitive to swelling, the region of the closure body, which lastly serves for sealing, can also be molded from an elastic polymer on the rigid valves by means of compound injection molding.

The thermoplastic polymers are those which are all commercially available types of polyamides, polyesters and polyolefins, their blends as well as those types modified with additives according to requirements. Therein are particularly preferred polyamides from the group PA6, PA6.6, PA6.9, PA6.10, PA11, PA12, PA12.12 and polyesters of type PET and PBT.

Referring now to the drawings.

Figure 10:
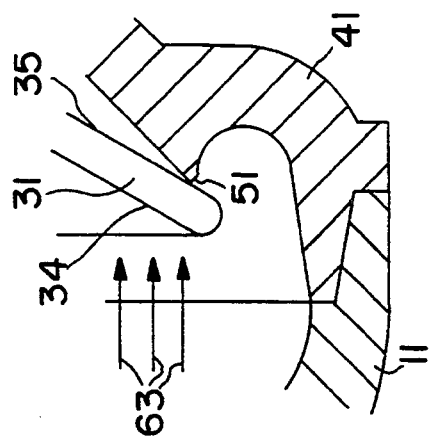
Figure 9:
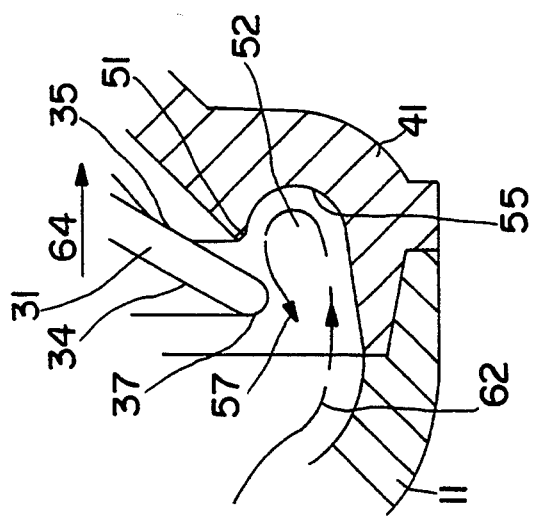
Figure 8:
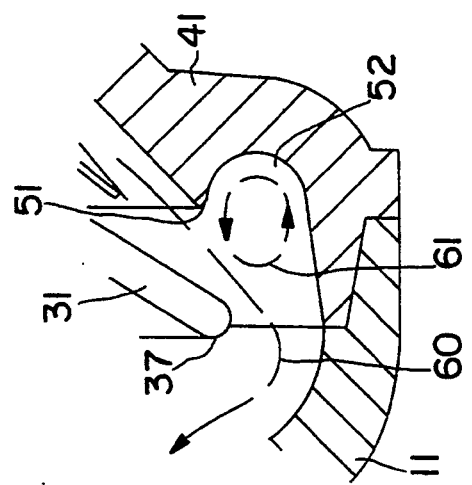
Figure 11:
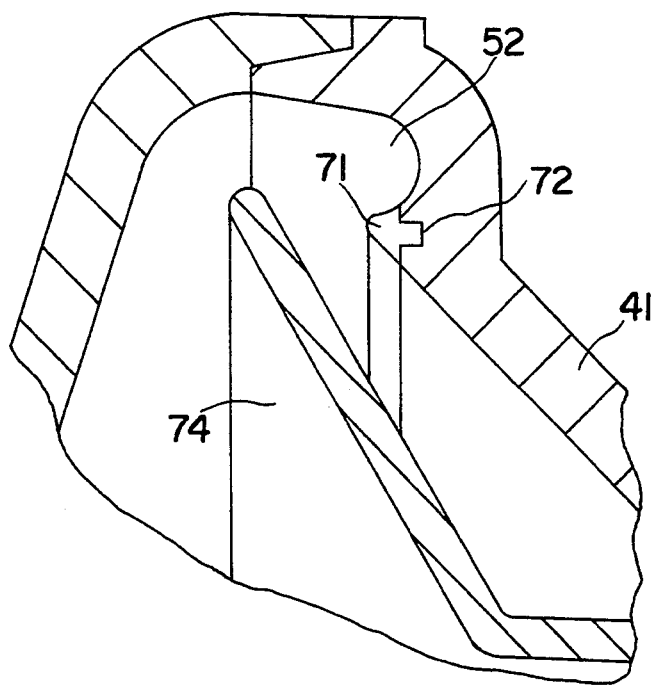
Figure 12:
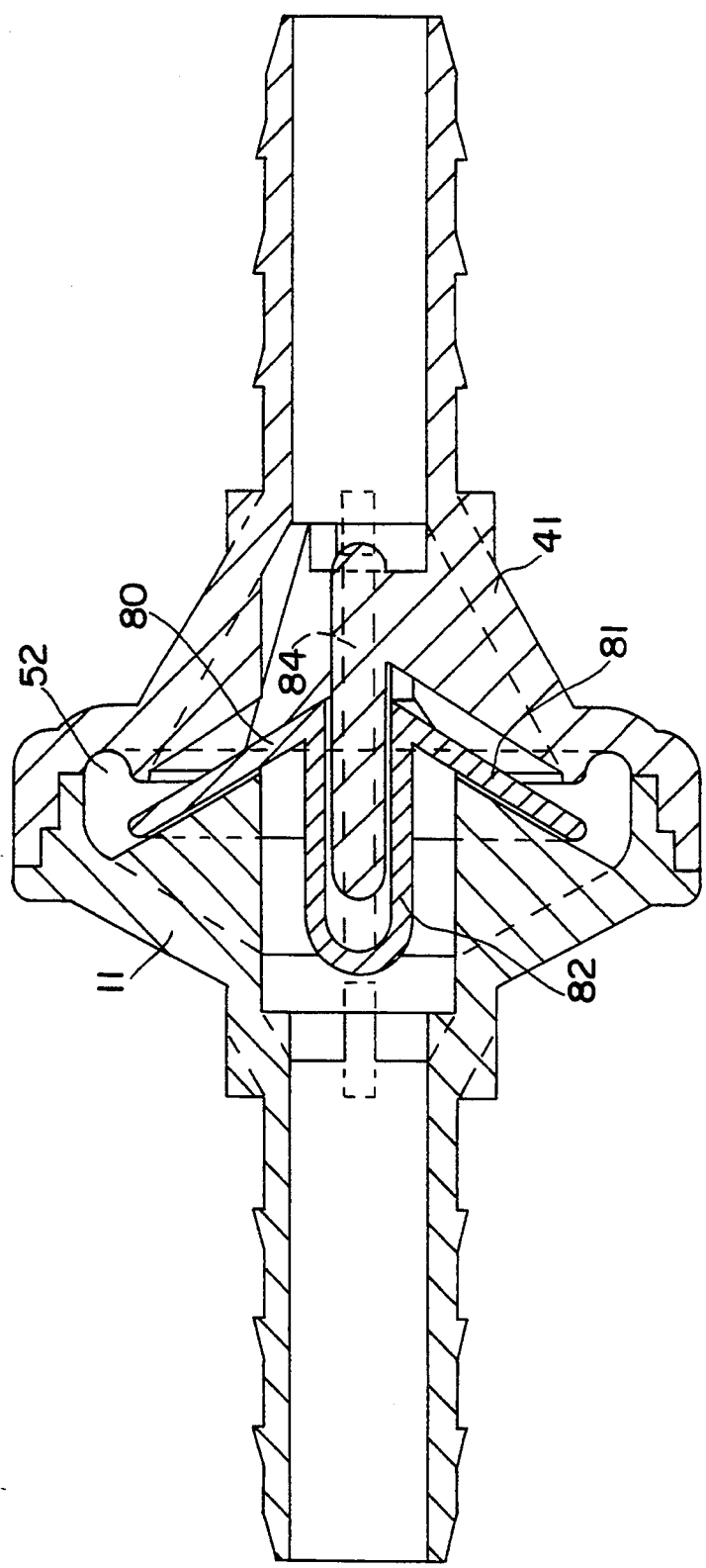

FIG. 8 illustrates flow conditions in the region of the sealing edge with the flow in the through-put direction, FIG. 9 illustrates flow conditions in the region of the sealing edge with the flow in the blocking direction, FIG. 10 illustrates the blocking position of the closure body in the region shown in FIGS. 8 and 9, FIG. 11 is a cross section in the region of the sealing edge through another embodiment of the check valve, and FIG. 12 is a further embodiment of a check valve in cross section.

Figure 1:
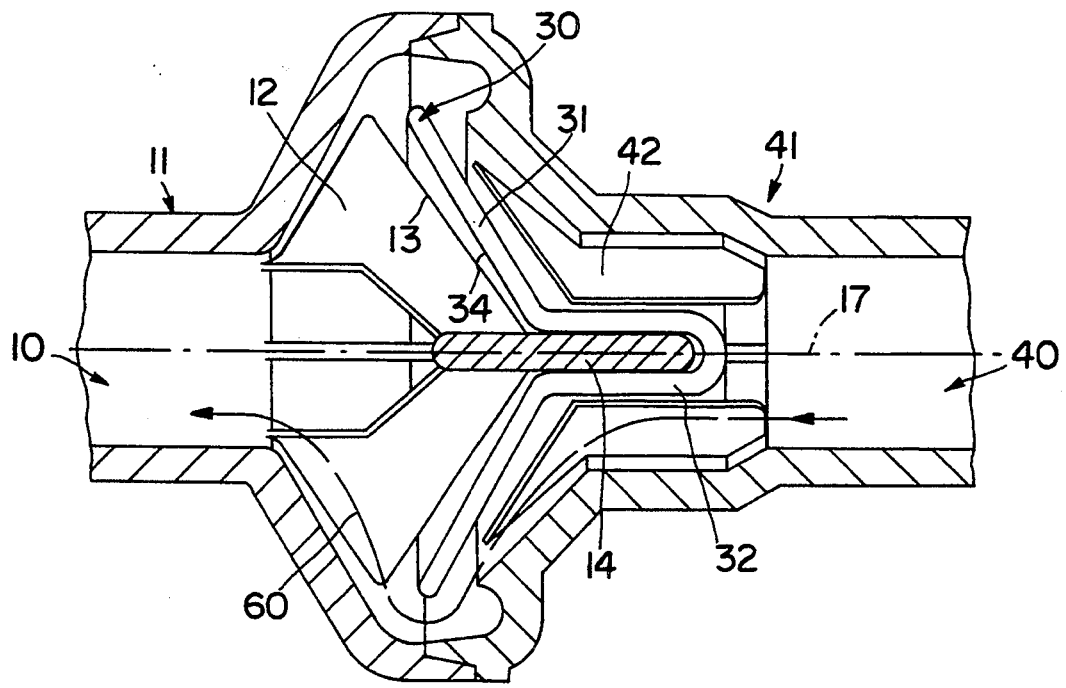
FIG. 1 is a cross section through a check valve in the open position.

The check valve shown in cross section in FIG. 1 comprises essentially an outlet housing 11, an inlet housing 41 as well as a closure body 30 and outlet housing 11 and the inlet housing 41 are connected with one another so as to be airtight. The check valve is shown in the open position so that from the flow inlet 40, a flow 60 can pass in the through-put direction toward the flow outlet 10 through the check valve. On the side of the flow inlet 40, for example a vacuum could be desired wherein the flow 60 indicates that for an increase of the vacuum medium is carried off from the region of the flow inlet 40 to the region of the flow outlet 10. For this purpose, the check valve must be in an open position.

The closure body 30 comprises a funnel-form portion 31 which is made a its free end to be open, and a tube-form funnel end 32's disposed on the tapering end region of the funnel-form portion 31. To move the closure body in the direction of the longitudinal axis 17 of housing 11, 41, the tube-form funnel end 32, closed at its end, is slid onto a pin 14 corresponds essentially to the inner diameter of the tube-form funnel end 32. In the maximum open position, preferably between the free end of the pin 14 and the closed end region of the tube-form funnel end 32, a small gap remains so that the movement of the closure body 30 toward the outlet housing 11 cannot be hindered.

Figure 7:
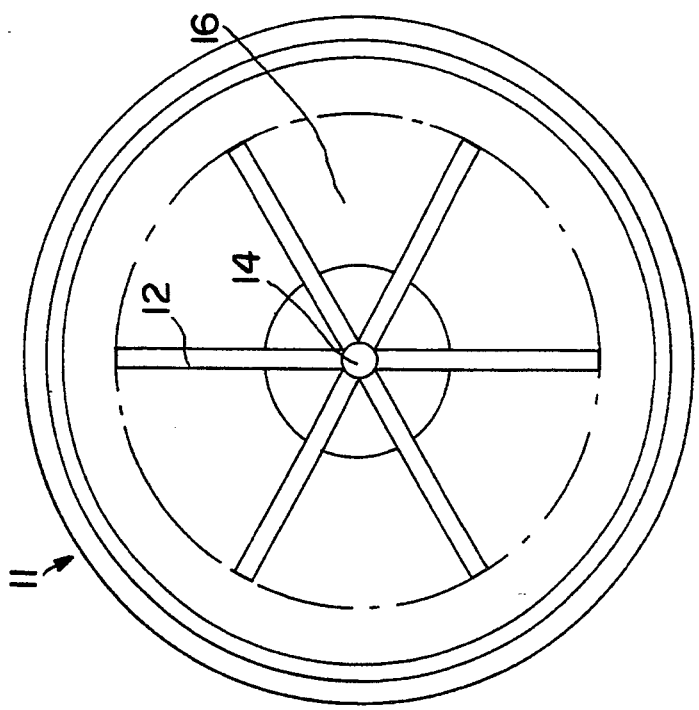
FIG. 7 is a top view onto the inside of the outlet housing.

A limitation of the maximum open position of the closure body 30 toward the outlet housing 11 is necessitated by webs 12 disposed in it and the arrangement of the webs 12 is evident particularly in FIG. 7. The webs 12 extend radially from the center of the outlet housing 11, are disposed at a distance to one another, and disposed on pin 14. Their free ends facing the funnel-form portion 31 serve as resting edges 13 for the inside 34 of the funnel-form portion 31. The resting edges 13 are inclined toward the longitudinal axis 17 in the direction of the outlet housing 11 and their slope corresponds to that of the funnel-form portion 31. Due to the section in FIG. 1, it is not readily apparent that in the maximum open position of the closure body 30, the funnel-form rests sealingly on the resting edges 13. So that the flow 60 can penetrate at the closure body 30 to the outlet housing 11, the outer diameter of the funnel-form portion 31 is smaller than the maximum inner diameter of the housing 11, 41 so that the flow 60 can penetrate between the free margin of the closure body 30 and the inner wall of housings 11, 41.

Figure 2:
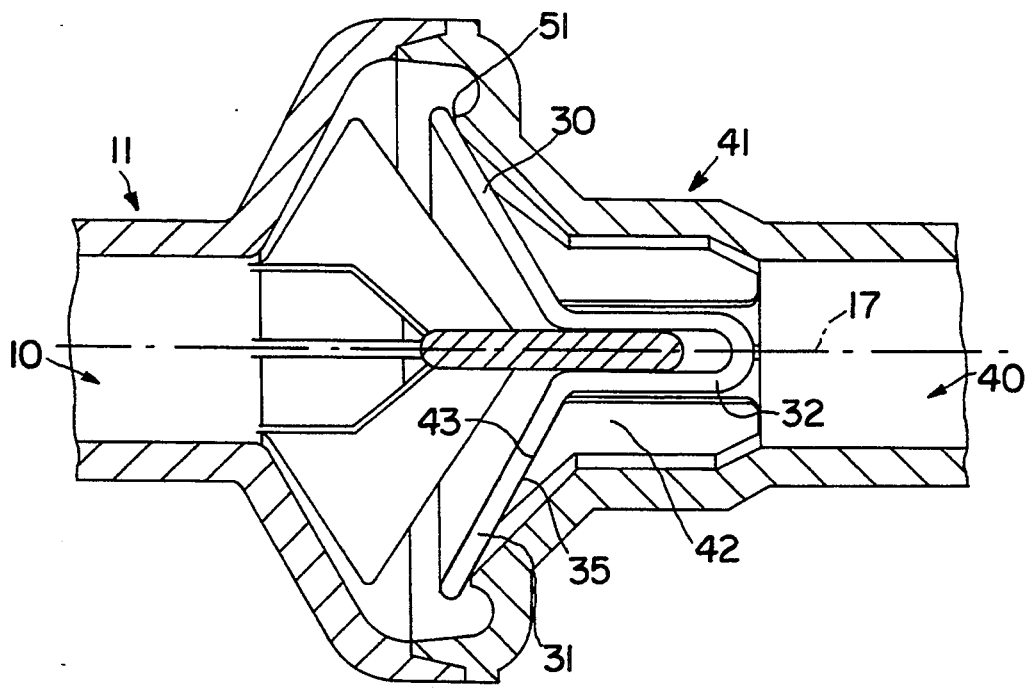
FIG. 2 is a cross section of FIG. 1 in the blocking position

FIG. 2 shows the closure body 30 in the blocking position in which no throughflow can take place between flow outlet 10 and flow inlet 40. For this purpose, the outside of the funnel-form portion 31 rests against the inner circumstance of the inlet housing 41 and there on a sealing edge 51. The sealing edge 51 is evident in FIG. 5 and the sealing edge with the resting contact on the funnel-form portion 31 is disposed in the proximity of its free end region. The outer diameter of the funnel-form portion 31 is preferably made so that it projects beyond the sealing edge 51. To brace the region located between the sealing edge 51 and the tube-form funnel end 32 of the funnel-form portion 31, it, in turn, is supported on its outside by webs 42 disposed on the inlet housing 41. The webs 42 are essentially made like the webs 12 and have, in addition, free edges again matched to the slope of the funnel-form portion 31 as resting edges 43 and are disposed at a distance from one another. The resting contact of the funnel-form portion 31 on the sealing edge 51 ensures that an excess pressure obtaining at the flow outlet 10 cannot arrive at the flow inlet 40 if in its region a low pressure or a vacuum obtains.

Figure 5:
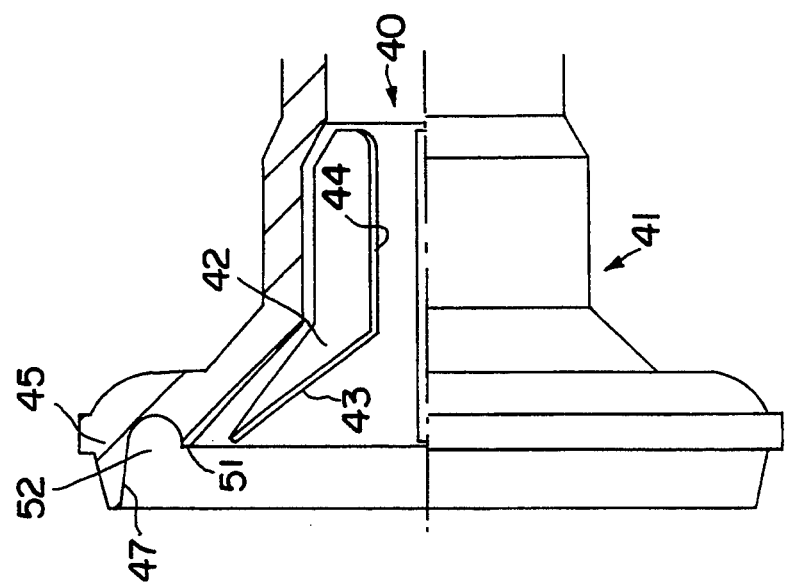
FIG. 5 is a cross section through the inlet housing only.
Figure 4:
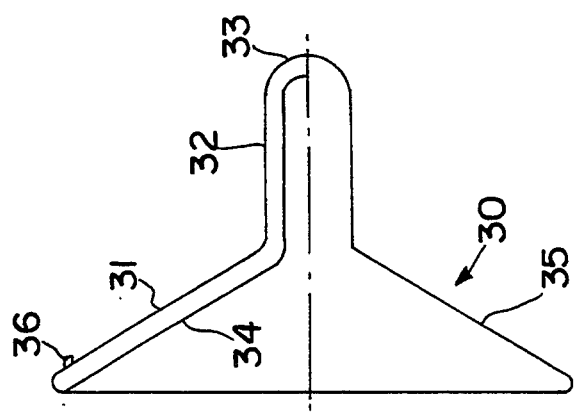
FIG. 4 is a cross section through the closure body.
Figure 3:
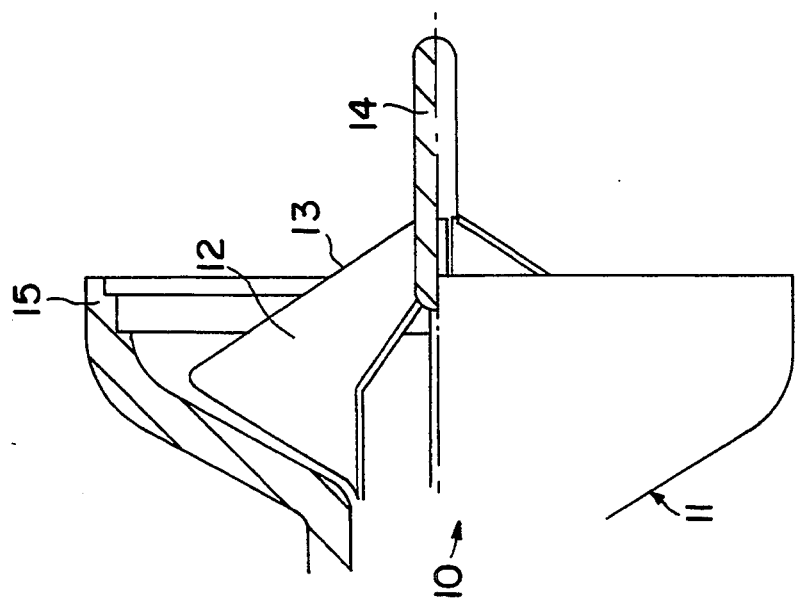
FIG. 3 is a cross section through the outlet housing only.
Figure 6:
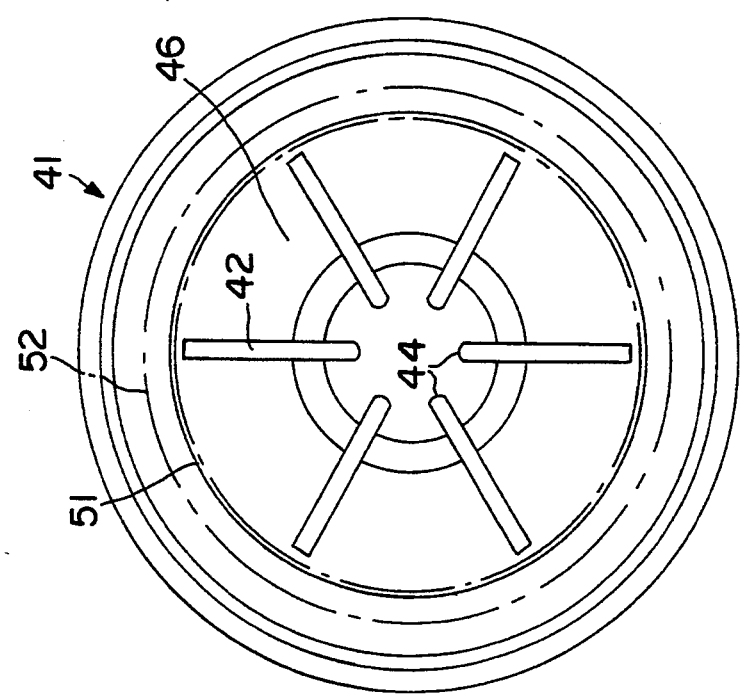
FIG. 6 is a top view onto the inside of the outlet housing

FIG. 3 to 5 each depict the structure of the outlet housing 11, the closure body 30 and of the inlet housing 41 while FIGS. 6 and 7 show top views onto the inner region of the inlet housing 41 and of the outlet housing 11. The cross section of the check valve is circularly relative to its longitudinal axis 17 as is particular evident in FIGS. 6 and 7.

FIG. 3 shows the webs 12 disposed on the pin 14 as a projecting element of the outlet housing 11 and their free end regions serving as resting edges 13 and extending obliquely. The housing 11 is produced in an one process step in an injection molding process with a simple tool (die). The graduated butt joint 15 is such that it can be connected airtight by means of a rotation or ultrasonic welding or another suitable process with the inlet housing 41.

FIG. 4 shows the closure body 30 with its funnel-form portion 31 and the tube-form funnel end 32 disposed integrally on it which is closed at its end 33. The funnel-form portion 31 is slid onto the pin 14 wherein in the maximum open position, the inside 34 of the funnel-form portion 31 rests intimately and tightly on the resting edges 13 of the webs 12. In the outer margin region of the funnel-form portion 31, there is disposed an encircling sealing contact line 36 which in the blocking position of the closure body 30 is the resting region of the outside 35 of the funnel-form portion 31 on the sealing edge 51 and in so far is made angularly. In the blocking position of the closure body 30, the outside 35 of the funnel-form portion 31 rests in corresponding manner on the resting edges 43 of the webs 42 of the inlet housing 41. The resting edges 43 of the webs 42 are located, viewed in the direction toward the longitudinal axis 17, below the sealing edge 51 and provides additional support for the funnel-form portion 31 in the presence of large pressurization.

FIG. 5 shows the inlet housing 41 with the webs 42 and their resting edges 43. In the continuation of the webs 42 toward the flow inlet 40, the inner edges 44 of the webs 42 leave behind the resting edges 43 in the direction of the longitudinal axis 17, a space which is greater than the outer diameter of the tube-form funnel end 32 of the closure body 30 so that it is guided exclusively by the pin 14. The sealing edge 51 is the annular resting edge for the funnel-form portion 31 and, consequently, is a type of ring seat for the closure body 30. To achieve inter alia a good sealing effect, the diameter of the sealing edge 51 as an annular resting edge is smaller than the outer diameter of the funnel-form portion whereby, the sealing contact line 36 is located on the funnel-form portion 31 somewhat removed from its free margin 37 on the outside 35. The sealing edge 51 is disposed relative to the resting edges 43 so that initially a secure resting of the sealing contact line 36 on the sealing edge 51 results before the outside 35 comes to rest on the resting edges 43. Toward the outside, a chamber 52 adjoins the sealing edge 51, which is arcuate and, when viewed from the sealing edge 51 toward the outside, first recedes to form a type of annular bead. The sealing edge 51 forms with the chamber 52 a stator for the deflection of a flow directed to the inlet housing 41. The flow conditions in this region will be explained in greater detail in conjunction with FIGS. 8 to 10.

The inlet housing 41 is produced in one process step by injection molding wherein its butt joint 45 for assembly of the inlet housing 41 with the outlet housing 11 corresponds to the butt joint 15.

FIG. 6 shows in top view onto the inside or the inlet housing 41 the distance of the webs 42 with respect to each other. A flow exiting the inlet housing 41 can reach the outlet housing 11 through the spaces 46 remaining free between the webs 42 past the closure body 30. The inner edges 44 of webs 42 are disposed at a distance to the longitudinal axis 17 so that the pin 14 can project unhindered into this region with the tube-form potion 32.

FIG. 7 shows the top view onto the inside of the outlet housing 11 wherein here also spaces 16 remain free through the spacing or the webs 12. In the open position of the check valve, the free margin 37 of the funnel-form portion 31 31 will rest approximately in the region of the free ends of webs 12, wherein a flow exiting from the inlet housing 41 can enter through the spacing of the inner housing wall to the free ends of the webs 12, past the funnel-form portion 31 through the spaces 16 into the outlet housing 11.

FIG. 8 shows the progression of the flow 60 directed toward the outlet housing 11 in the through-put direction in the region of chamber 52 and the free margin 37 of the funnel-form portion 31. The flow 60 is not hindered by the chamber 52 since its open end points to the direction of flow of flow 60 whereby the medium disposed in the chamber 52 is only circulated as is indicated by the flow arrows 61.

FIG. 9 shows the region corresponding to FIG. 8 of a flow 62 extending in the blocking direction at the moment in which the closure body 30 is still in the open position i.e. the funnel-form portion 31 still rests sealingly on the sealing edge 51. The flow 62 enters the chamber 52 and is there deflected by approximately 180° on the inner wall 55 of the chamber 52 as is indicated by flow 57. This stator effect of chamber 52 generates in this region a pressure difference which acts on the free margin 37 of the funnel-form portion 31 since the free margin region of the funnel-form portion 31 projects into the flow region of the chamber 51. The pressure difference generates a pressure gradient between the inside 34 and the outside 35 of the funnel-form portion 31 whereby it is moved in the direction of the pressure gradient toward the lesser pressure, i.e. toward the inlet housing 41, as indicated by arrow 64. The chamber 52 which is directed with its open end toward the entering flow 62 in the blocking direction consequently supports the closing motion of the closure body 30 through the stator effect of chamber 52.

FIG. 10 shows the region, again corresponding to FIGS. 8 and 9, wherein the closure body 30 or the funnel-form portion 31 is in sealing contact on the sealing edge 51. The pressure difference between the inside 34 on the outlet-housing side and the outside 35 on the inlet-housing side of the closure body 30 generates a force component directed toward the inlet housing 41 which is indicated by arrow 63 and which holds the closure body 30 in the blocking position.

FIG. 11 shows in cross section another embodiment of the check valve of the invention and specifically in the region of chamber 52. The closure body 74 is made of a rigid non-elastomeric material. The corresponding sealing edge 71, in contrast, is made of an elastic material different from the material of the inlet housing 41 and the elastic sealing edge 71 is set into a groove 72 of the inlet housing 41 to ensure in the presence of closure body 74 resting on it the intended sealing effect in the blocking position of the closure body 74. Methods are known with which the application of sealing edge 71 is possible in an injection molding process together with the production of the inlet housing 41 without additional handling. The groove 72 increases therein the contact area of the materials of the elastic sealing edge 71 as well as of the inlet housing 41 and provides, moreover, a form closure.

FIG. 12 shows a further variant of the check valve of the invention which corresponds essentially to the check valve of FIGS. 1 to 10. But in this embodiment, the pin 84 is not disposed on the outlet housing 11 but rather on the inlet housing 41 whereby the closed end 83 of the tube-form funnel end 82 of the closure body 80 is directed toward the outlet housing 11 to be able to be placed with its open end on the pin 84. The closure body 80 in this embodiment is no longer funnel-form in cross section, as is the case in the closure body 30, but rather is shaped as a mushroom form body. For the remainder, the functional mechanism of the check valve of FIG. 12 corresponds to that of the check valve show in FIGS. 1 to 10, wherein here also is provided in particular the chamber 52 generating a stator effect.

Various modifications of the check valve of the invention may be made without departing from the spirit or scope thereof and it is to be understood that the invention is intended to be limited only as defined in the appended claims.

What is claimed is:

1. A diaphragm-less and spring-less check valve for gaseous media comprising an inlet housing (41) having an elastic sealing edge (51), and outlet housing (11) and a funnel-form closure body (30) disposed in between the housings, which blocks the check valve by resting on the elastic sealing edge (51) and a tube end (32) of the funnel-form is closed which is guided so as to be axially (14) movable and capable of being subjected to pressure from both sides in any desired position and/or state of the valve, wherein the closure body (30) is moveable exclusively on the basis of a differential pressure between inlet (41) and outlet housing (11) in the closed position against the sealing edge (51) and in the through-put position away from the sealing edge.

2. A check valve of claim 1 wherein the closure body (30) is guided axially.

3. A check valve of claim 1 wherein a region of the closure body (30) for its guidance and a region of the closure body (30) for closing the check valve are independent of one another.

4. A check valve of claim 1 wherein the closure body (30) is disposed in the outlet housing (11) (41).

5. A check valve of claim 1 wherein the tube end (32) of the funnel-form is disposed on a pin (14).

6. A check valve of claim 1 wherein the region next to the sealing edge (51) acts as a guide device of the flow.

7. A check valve of claim 6 wherein a chamber (52) next to the sealing edge (51) deflects (57) a medium (62) by approximately 180° flowing in this region in the direction of the inlet housing (41) before it flows past the sealing edge (51).

8. A check valve of claim 7 wherein the chamber (52) is an annular depression or bead.

9. A check valve of claim 6 wherein a medium (60) flowing in the direction of the outlet housing (11) can flow largely unhindered through chamber (52) out of the inlet housing (41).

10. A check valve of claim 1 wherein the sealing edge (51) is an annular resting edge for the funnel-form portion (31).

11. A check valve of claim 1 wherein the outer diameter of the free margin (37) of the funnel-form portion (31) is greater than the diameter of the sealing edge (51) acting as an annular resting edge.

12. A check valve of claim 1 wherein the maximum inner diameter of the housings (11, 41) is greater than the outer diameter of the funnel-form portion (31).

13. A check valve of claim 1 wherein devices (12, 42) are disposed on the outlet housing (11) and on the inlet housing (41) for the resting contact of the funnel-form portion (31).

14. A check valve of claim 13 wherein the devices (12, 42) are webs extending radially from the center or the housings (11, 41) at a distance from one another.

15. A check valve of claim 14 wherein the free edges (43, 43) of the webs (12, 42) facing the funnel-form portion (31) and serving as resting edges (13, 41) are inclined lowered the longitudinal axis (17) of the housings (11, 43) wherein the slope of the free edges corresponds essentially to that of the funnel-form portion (31).

16. A check valve of claim 1 wherein all elements are made of polymers.

17. A check valve of claim 16 wherein the polymer material is a thermoplastic polymer.

18. A check valve of claim 16 wherein the polymer is selected from the group consisting of polyamides, polyolefins and polyesters.

19. A check valve of claim 1 wherein inlet housing (41), outlet housing (11), and closure body (30) are at least partially made of polymer.

20. A check valve of claim 19 wherein the polymer is selected from the group consisting of polyethylene terephtalate and polybutylene terphthalate.

21. A check valve of claim 19 wherein the polymer is selected from the group consisting of PA6, PA6.6, PA11 PA12 and PA12.12.

22. A check valve of claim 1 wherein the sealing edge (51) and/or the closure body (30) are made at least partially of an elastic polymer.

23. A check valve of claim 22 wherein the polymer is selected from the group consisting of polyetheramides, polyetheresteramides and polyetheresteretheramides.

24. A check valve of claim 1 wherein the material of the line adjoining the inlet housing (41) and outlet housing (11) is made of the same materials as the parts of the check valve.

25. A check valve of claim 1 wherein the closure body (30) is disposed in the inlet housing (41).

26. A check valve of claim 1 wherein a projecting pin (14) is disposed in the longitudinal axis (17) of a housing (11) and inlet housing (41) for arranging the closure body (30).

* * * * *